(12) United States Patent
Raftis

(10) Patent No.: US 6,412,514 B1
(45) Date of Patent: Jul. 2, 2002

(54) FLIP CHECK VALVE

(75) Inventor: Spiros G. Raftis, Mt. Lebanon, PA (US)

(73) Assignee: Red Valve Company, Inc., Carnegie, PA (US)

( * ) Notice: Subject to any disclaimer, the term of this patent is extended or adjusted under 35 U.S.C. 154(b) by 0 days.

(21) Appl. No.: 09/697,558

(22) Filed: Oct. 26, 2000

Related U.S. Application Data

(60) Provisional application No. 60/161,526, filed on Oct. 26, 1999, and provisional application No. 60/183,262, filed on Feb. 17, 2000.

(51) Int. Cl.[7] .............................................. F16K 15/14
(52) U.S. Cl. ................ 137/111; 137/512.15; 137/515.5
(58) Field of Search ......................... 137/512.15, 512.1, 137/515.5, 1

(56) References Cited

U.S. PATENT DOCUMENTS

| | | | | |
|---|---|---|---|---|
| 3,463,189 A | * | 8/1969 | Fitzpatrick | 137/512.15 X |
| 3,519,012 A | * | 7/1970 | Van Patten | 137/512.15 X |
| 3,807,444 A | * | 4/1974 | Fortune | 137/512.15 X |
| 4,444,219 A | * | 4/1984 | Hollenstein | 137/512.15 X |
| 5,143,117 A | * | 9/1992 | Klein | 137/512.15 |
| 5,769,125 A | | 6/1998 | Duer et al. | |
| 5,848,605 A | | 12/1998 | Bailey et al. | |
| 5,947,152 A | | 9/1999 | Martin et al. | |

\* cited by examiner

*Primary Examiner*—Kevin Lee
(74) *Attorney, Agent, or Firm*—Webb Ziesenheim Logsdon Orkin & Hanson, P.C.

(57) ABSTRACT

A check valve for placement in a fluid conduit, includes a separator element with at least one opening; the opening allows fluid flow through the separator element. A pliant sealing member is attached to a downstream side of the separator element, covering the opening. During forward flow, this pliant sealing member deforms, allowing fluid to pass around it. However, during reverse fluid flow, this pliant sealing member flattens and covers the opening, preventing reverse fluid flow through the opening.

16 Claims, 5 Drawing Sheets

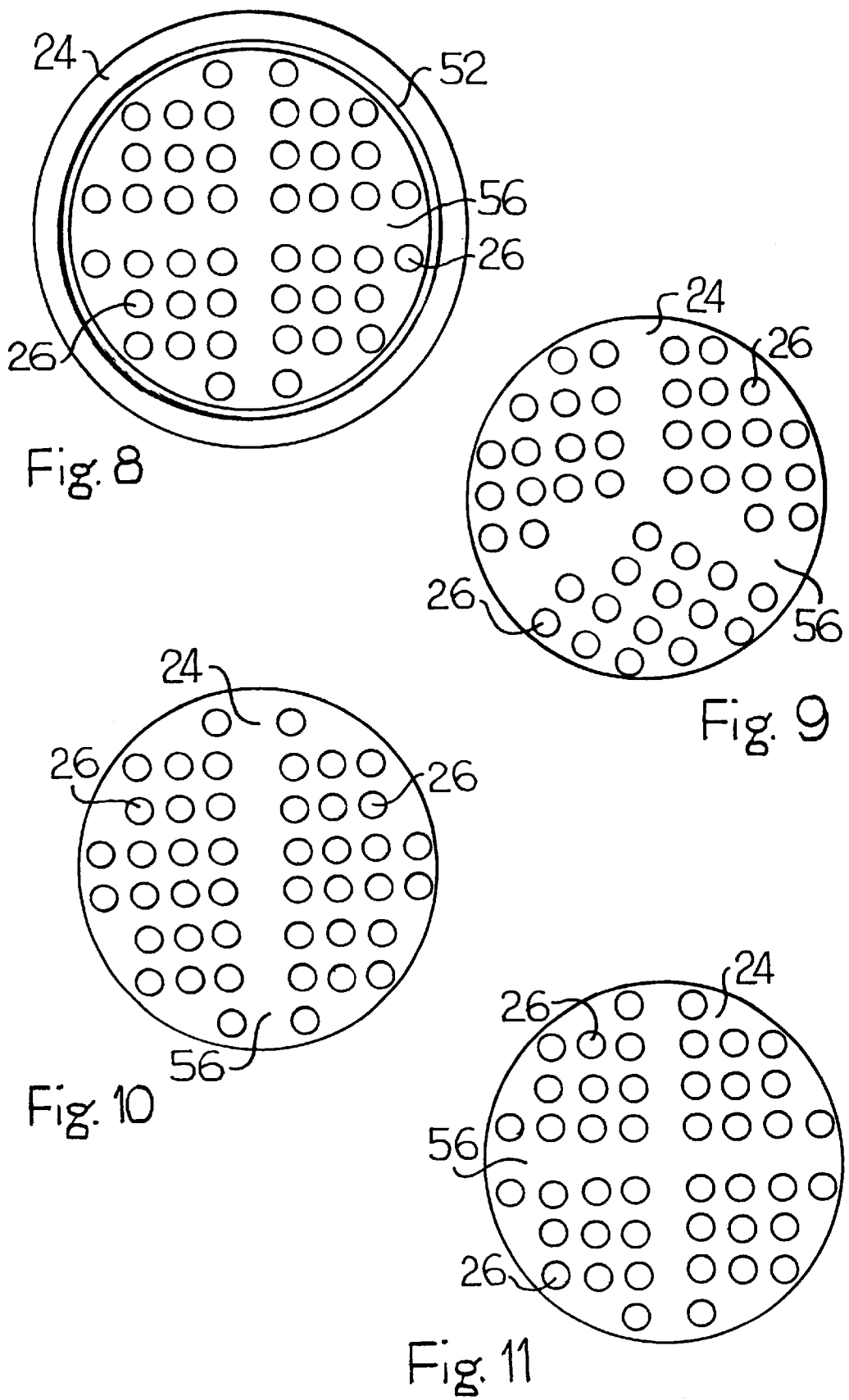

FLIP CHECK VALVE

CROSS-REFERENCE TO RELATED APPLICATIONS

This application claims the benefit of U.S. Provisional Application Serial No. 60/161,526, filed Oct. 26, 1999, and U.S. Provisional Application Serial No. 60/183,262, filed Feb. 17, 2000.

BACKGROUND OF THE INVENTION

1. Field of the Invention

The present invention relates to check valves, and, in particular, to inversion resistant check valves.

2. Description of the Prior Art

A check valve is essentially a valve which allows fluid to flow in only one direction through a conduit, while closing and preventing back or reverse flow, when back pressure builds up downstream of the valve to a level greater than the upstream fluid pressure head.

Check valves are used in various fluid transportation operations and must include some means of allowing the forward flow of liquid yet preventing any back flow. Further, it is desirable to have maximum flow at the lowest possible pressure drop in the forward direction of flow, commonly referred to as headloss. It is also necessary to provide some means for resisting collapse under the back pressure or reverse flow of the fluid.

As demonstrated in U.S. Pat. No. 5,769,125 to Duer et al., a check valve may employ a hinge and trough construction, which is an inversion deterrent. Further, as seen in U.S. Pat. No. 5,848,605 to Bailey et al., a spring and poppet mechanism may be utilized to allow forward fluid flow, while, at the same time preventing back flow. Still another example of a check valve with back flow prevention is disclosed in U.S. Pat. No. 5,947,152 to Martin et al. In this patent, a resilient seal ring is used to engage opposed walls of the valve body, allowing forward fluid flow and preventing back flow.

While all of the prior art uses some form of mechanism to prevent back flow, most of the previously mentioned patents are unable to withstand very high back pressure. Further, the prior art that discusses intricate mechanical devices to prevent back flow and inversion are cost prohibitive in many situations. Still further, the prior art, which does provide increased inversion protection, does so at the cost of pressure drop in the forward direction of flow. This headloss degrades the flow pattern and velocity in the valve mechanism, decreasing efficiency.

It is, therefore, an object of this invention to provide a check valve that overcomes the design problems encountered in the prior art. It is another object of this invention to provide high inversion resistance during high back pressure situations, in a much more cost-effective manner. It is also an object of the present invention to allow smooth fluid flow in the forward direction, with little headloss through the valve.

SUMMARY OF THE INVENTION

The present invention is a check valve for placement in a fluid conduit including a separator element having at least one opening to allow fluid flow through the separator element. A pliant sealing member is attached to one side of the separator element, covering the separator element opening. This pliant sealing member is configured to deform during forward fluid flow, allowing fluid to pass around the pliant sealing member, and to flatten during reverse fluid flow, covering the opening. In this manner, reverse fluid flow is prevented from entering the opening.

In operation, the fluid flow of liquid enters the check valve area, passes through the opening of the separator element, deflecting the pliant sealing member forward. The fluid passes around the separator element and exits, continuing through the fluid conduit. When back flow is encountered, the pliant sealing member is "flipped" backwards, returning to its flat, undeflected state and engaging the separator element. Once in this state, the pliant sealing member effectively blocks the opening in the separator element, preventing passage of liquid in the reverse direction. The invention also includes a method of conveying fluid and preventing reverse fluid flow in a conduit.

The invention itself, both as to its construction and its method of operation, together with additional objects and advantages thereof, will best be understood from the following description of specific embodiments when read in connection with the accompanying drawings.

BRIEF DESCRIPTION OF THE DRAWINGS

FIG. 8 shows a front view of the separator element according to the seventh embodiment of the present invention;

FIG. 9 shows a front view of a separator element according to an eighth embodiment of the present invention;

FIG. 10 shows a front view of a further embodiment of the openings of the separator element according to the eighth embodiment of the present invention; and FIG. 11 shows a front view of a further embodiment of the openings of the separator element according to the eighth embodiment of the present invention.

DETAILED DESCRIPTION OF THE PREFERRED EMBODIMENTS

Figure 1:
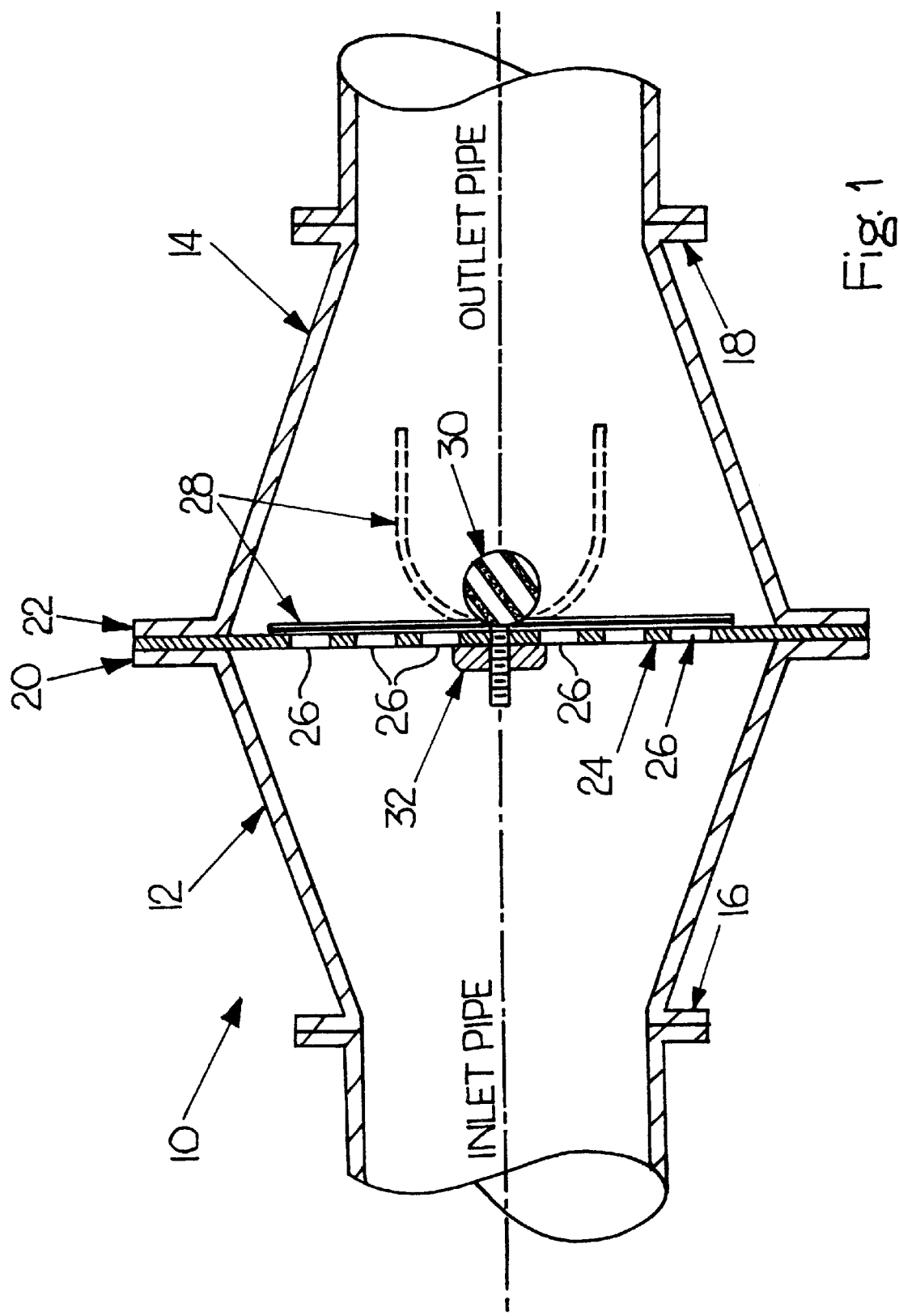
FIG. 1 shows a side sectional view of a first embodiment of the present invention.

The present invention is a check valve 10 with primary application in the area of large diameter "clean" water usage operations. While check valve 10 is typically used in "inline" configurations, in a preferred embodiment, as shown in FIG. 1, the present invention check valve 10 comprises an inlet body half 12 connected to an outlet body half 14. Both the inlet body half 12 and the outlet body half 14 can be constructed of metal or plastic materials, selected to be compatible with the process fluid and pressure requirements. The inlet body half 12 begins with an inlet flange 16 which diverges and terminates in an inlet body flange 20.

The outlet body half 14 begins with an outlet body flange 22, converges and terminates in an outlet flange 18. The inlet body half 12 is connected to the outlet body half 14 via the inlet body flange 20 and the outlet body flange 22. Further, it is contemplated that suitable gaskets may be required to provide a fluid-tight seal. Inlet flange 16 and outlet flange 18 are provided so that the check valve 10 may be connected to a piping system in a conventional manner.

Figure 2:
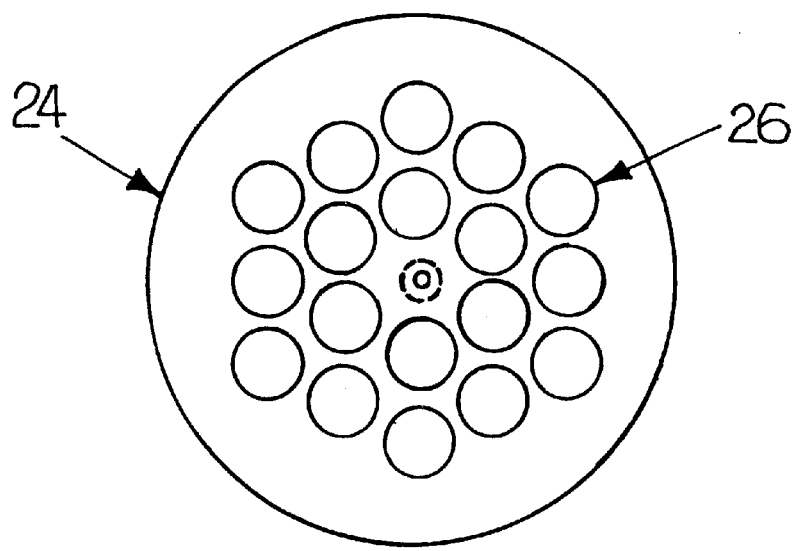
FIG. 2 shows a front view of the separator element.

Clamped between the inlet body flange 20 and the outlet body flange 22 is a separator element 24 bisecting the check valve 10. Any fluid that enters the inlet body half 12 must necessarily encounter the separator element 24. Additionally, the separator element 24 must have at least one passage 26 in order for fluid to flow through the separator element 24. In the preferred embodiment, the separator element 24 has multiple separator element passages 26. These passages 26 can be of unlimited shapes and patterns (as long as fluid flow is acceptable and the structural integrity of the separator element 24 is not compromised), and FIG. 2 illustrates a typical separator element 24 design.

A pliant sealing member 28 is attached to the center of the separator element 24 via a retaining element, for example, retaining bar 30. The retaining bar 30 is secured to the separator element 24 by a retaining nut 32, fastening the pliant sealing member 28 at its center to the separator element 24.

In operation, fluid flows through a piping system inlet pipe into the check valve 10. Initially, the fluid enters the inlet body half 12, encountering the separator element 24 and passing through the separator element passages 26. As fluid contacts the pliant sealing member 28, the pliant sealing member 28 is deflected forward into the outlet body half 14. The fluid continues by and around the now deflected pliant sealing member 28, through the outlet body half 14 and into a piping system outlet pipe. If back pressure and back flow arises, the fluid flow reverses, flattening the pliant sealing member 28 flush against the separator element 24. In this manner, the separator element passages 26 are fully covered by the pliant sealing member 28 and reverse flow is stopped. Overall, using the check valve 10 in this operation will allow forward flow and disallow reverse flow of the process fluid. This invention is particularly useful in larger diameter applications, for example 48-inch or 60-inch water lines operating with high back pressures.

Since high back pressure may, in some instances, extrude the pliant sealing member 28 back through the separator element passages 26, one or more plies of a reinforcing layer, such as fabric, nylon, polyester or Kevlar®, can be included in the construction of the pliant sealing member to strengthen the pliant sealing member 28. Constructed with low durometer elastomer reinforced with plies, the pliant sealing member 28 can be made both strong enough to resist high back pressure, and, at the same time, pliable enough to provide excellent sealing at the separator element 24.

Figure 3A:
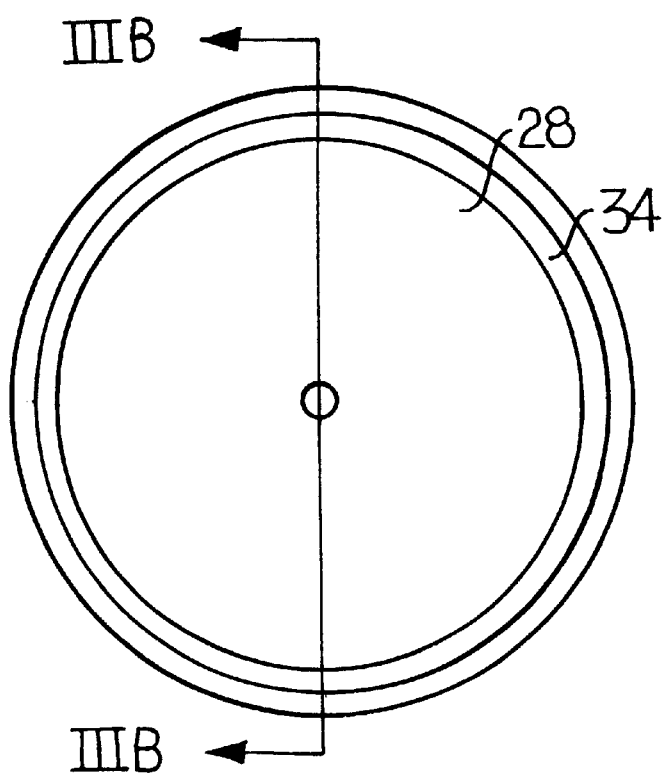
FIG. 3a shows a front view of a pliant sealing member according to a second embodiment of the present invention.
Figure 3B:
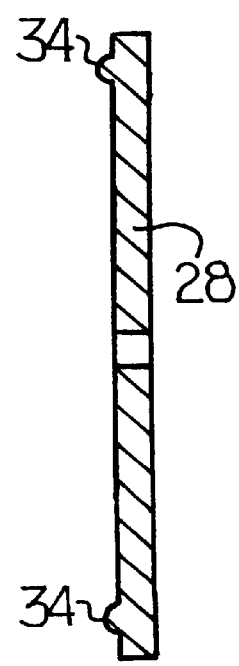
FIG. 3b shows a side sectional view of the pliant sealing member of FIG. 3a taken along line A—A.

A second embodiment is illustrated in FIGS. 3a and 3b. The overall invention and operation of the second embodiment is identical as hereinabove described. However, in this embodiment, an inner surface of the pliant sealing member 28 is formed with a seal 34, typically an integral O-ring, around the outside diameter of the pliant sealing member 28. During reverse fluid flow, the seal 34 engages the separator element 24 and provides a substantially fluid-tight seal between the pliant sealing member 28 and the separator element 24. The integral O-ring 34 is molded on the pliant sealing member 28 and engages the outer periphery of the separator element 24 in order to provide a secondary sealing area against the separator element 24, when back flow conditions are present.

Figure 4:
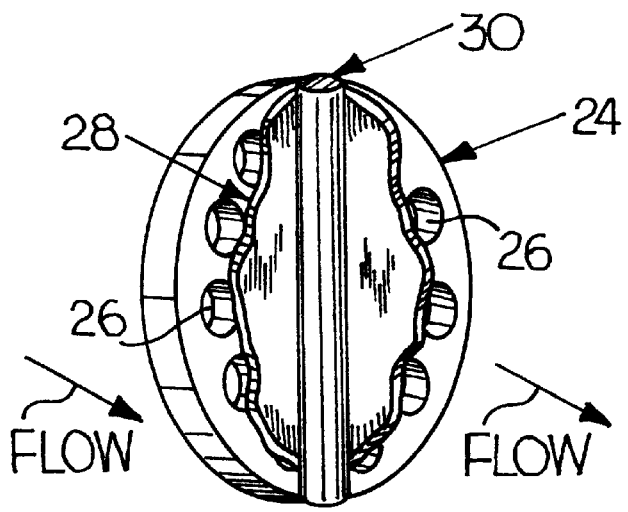
FIG. 4 shows a perspective view of a pliant sealing member and separator element according to a third embodiment of the present invention.

A third embodiment is illustrated in FIG. 4. In this embodiment, the check valve 10 is identical as hereinabove described, however, the retaining bar 30 extends vertically, bisecting the pliant sealing member 28. The retaining bar 30 is still utilized to secure the pliant sealing member 28 against the separator element 24, but also serves to reinforce the pliant sealing member 28, preventing sagging during periods of no flow. This retaining bar 30 may be made of any suitable cross-sectional shape; it may be hollow or solid. Further, the retaining bar 30 can be made with metal bar or rubber, allowing "give" to the rubber membrane and enhancing life under flow conditions.

Figure 5A:
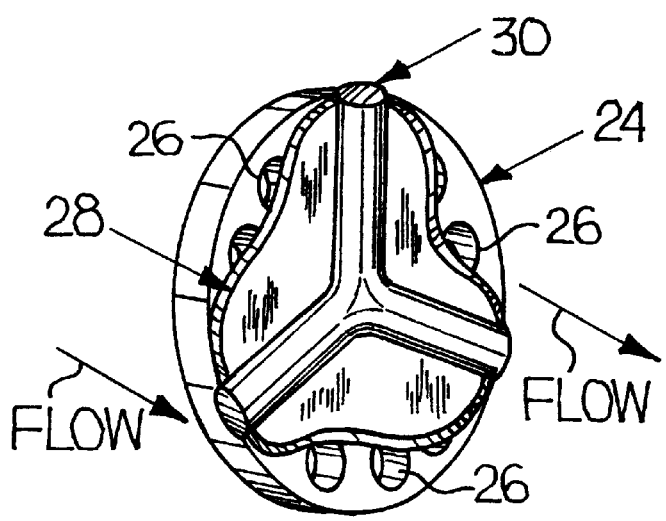
FIG. 5a shows a perspective view of a pliant sealing member and a separator element according to a fourth embodiment of the present invention.

It is envisioned that the retaining bar 30 may also comprise at least three arms extending centrally from the pliant sealing member 28. For example, in a fourth embodiment, as shown in FIG. 5a, the retaining bar 30 may consist of three connected equilaterally-spaced bars extending from the center point of the pliant sealing member 28. This embodiment would provide even further support to the pliant sealing member 28 during periods of no flow. In addition, this embodiment may be particularly useful in large diameter pipe applications.

Figure 5B:
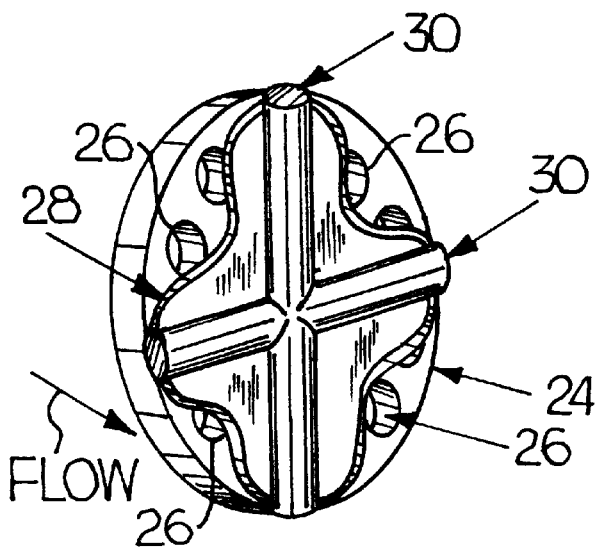
FIG. 5b shows a perspective view of a pliant sealing member and a separator element according to a fifth embodiment of the present invention.

In a fifth embodiment, as shown in FIG. 5b, the retaining bar 30 may consist of four connected equilaterally-spaced bars, extending from the center point of the pliant sealing member 28. The retaining bar 30 thus resembles a cruciform. This embodiment would provide still further support to the pliant sealing member 28 during periods of no flow. Additionally, this embodiment may also be utilized in large diameter pipe applications. In addition, this embodiment is preferred when the invention is oriented in a horizontal manner (i.e., with the piping system running vertically), with the pliant sealing member 28 on the underside of the separator element 24. Using this embodiment of the retaining bar 30 prevents the pliant sealing member 28 from flipping and remaining in the open position due to gravity.

Figure 6:
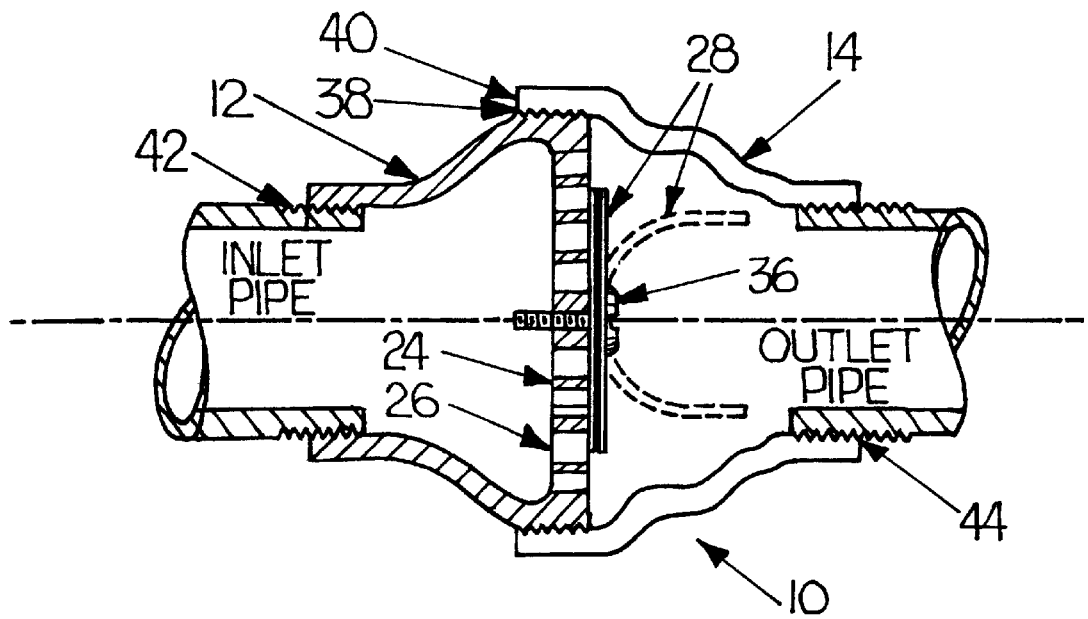
FIG. 6 shows a side sectional view of a sixth embodiment of the present invention.

A sixth embodiment is illustrated in FIG. 6, which is particularly adapted for smaller diameter pipeline applications. In this embodiment, the inlet body half 12 terminates with inlet body pipe threads 38. Likewise, the outlet body half 14 begins with outlet body pipe threads 40 which are constructed to mate with the inlet body pipe threads 38. The inlet body half 12 begins with the inlet pipe threads 42 and the outlet body half 14 ends with the outlet pipe threads 44. Both the inlet pipe threads 42 and the outlet pipe threads 44 are utilized to connect the check valve 10 to a smaller diameter pipe system.

In this sixth embodiment, the separator element 24 is directly attached to (or integrally formed with) the end of the inlet body half 12. The pliant sealing member 28 is attached to the center of the separator element 24 via a retaining screw 36. In operation, this embodiment is identical to the invention as hereinabove described. The threaded connections promote more secure and economical usage of the invention in small diameter pipe applications.

Figure 7:
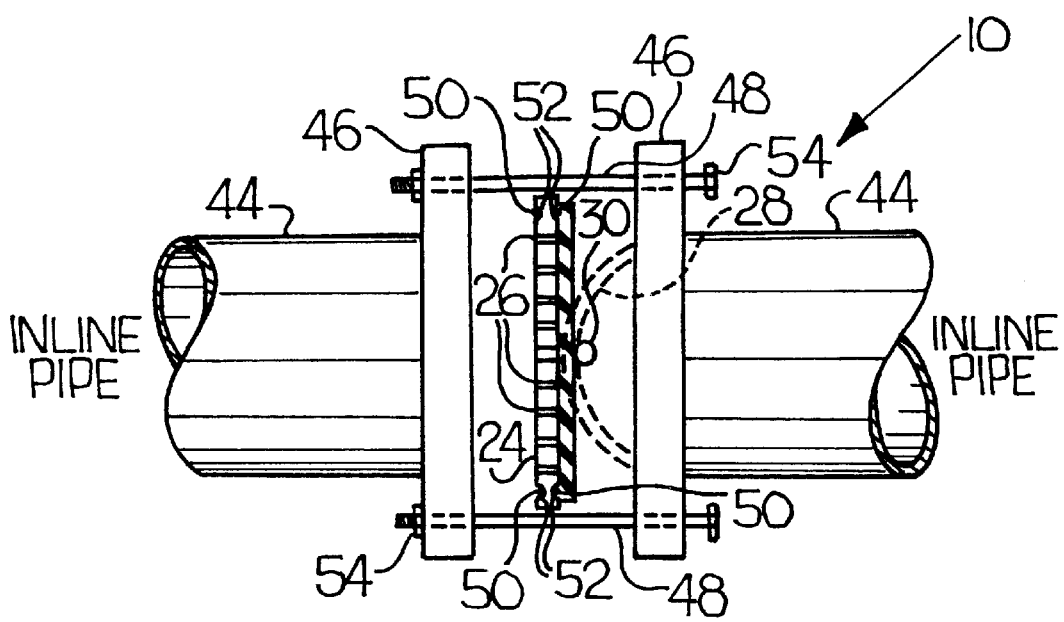
FIG. 7 shows a side exploded sectional view according to a seventh embodiment of the present invention.

A seventh embodiment is illustrated in FIG. 7, which demonstrates another inline application of the present invention 10. Pipe flanges 46 are secured together using bolt mechanisms 54 around the perimeter. Attached directly between these pipe flanges 46 is a separator element 24 with separator element passages 26. On both sides of the separator element 24 and around the perimeter are circular support plate O-ring grooves 52. As seen in FIG. 8, the support plate O-ring grooves 52 are particularly adapted to receive support plate O-rings 50, which seal the separator element 24 between the pipe flanges 46.

Also, as seen in this embodiment, the separator element passages 26 may be arranged so as to leave solid, unopened areas 56 in the separator element 24 (shown in FIG. 8). These solid, unopened areas 56 add strength to the separator element 24. Further, the solid, unopened areas 56 create an overall stronger valve. After assembly, the pliant sealing member 28 (not shown) is attached to the downstream side of the separator element 24 via the retaining bar 30 and retaining nut 32 (not shown). In operation, this embodiment operates as hereinabove described. Further, this seventh embodiment is more cost-effective in its manufacture.

Three variations of the separator element 24, according to an eighth embodiment of the invention, are illustrated in FIGS. 9–11. As seen in these variations, the placement of the separator element passages 26 on the separator element 24 can be drilled so as to provide the aforementioned solid, unopened areas 56. These solid, unopened areas 56 promote a stronger separator element 24. So as not to produce too much pressure drop across the valve, these solid, unopened areas 56 can directly correspond to the geometric shape of the retaining bar 30. For example, the retaining bar 30 of the fourth embodiment consists of three connected equilaterally-spaced bars, extending from the center point of the pliant sealing member 28. So, for the fourth embodiment, as illustrated in FIG. 9, the solid, unopened areas 56 would correspond directly to the shape of the retaining bar 30. Likewise, the solid, unopened areas 56 can correspond to each geometric shape of the retaining bar 30. These solid, unopened areas 56, while slightly increasing the pressure drop, greatly increase the strength of the separator element 24 and, in turn, the valve 10.

Overall, the present invention creates an efficient and durable inversion resistant check valve 10 with high back pressure capability and low pressure drop in the forward direction. Further, the present invention is cost-effective and particularly adapted to large diameter pipe applications.

It will be evident to those of ordinary skill in the art that various changes and modifications may be made to the present invention without departing from the spirit and scope thereof. The specific embodiments described herein are intended to be illustrative of, and not restrictive of, the present invention. This invention has been described with reference to the preferred embodiments. Obvious modifications and alterations will occur to others upon reading and understanding the detailed description.

I claim:

1. A check valve for placement in a fluid conduit, comprising:

a separator element having at least one opening to allow fluid flow through the separator element;

a pliant sealing member attached to one side of the separator element and configured to cover the at least one opening;

the pliant sealing member configured to deform during forward fluid flow, allowing fluid to pass around the pliant sealing member;

the pliant sealing member configured to flatten during reverse fluid flow, covering and preventing reverse fluid flow through the at least one opening; and a retaining element attaching the pliant sealing member to the separator element;

wherein at least one solid, unopened area on the separator element corresponds to the shape of the retaining element.

2. The check valve of claim 1, further comprising:

an inlet body half defining an inlet passage through which fluid flows;

an outlet body half defining an outlet passage through which fluid flows;

wherein the separator element and pliant sealing member is positioned between the inlet body half and the outlet body half.

3. The check valve of claim 1, wherein the retaining element is a bar extending substantially across the diameter of the separator element.

4. The check valve of claim 1, wherein the retaining element has at least three arms extending from a central connection point, with the pliant sealing member positioned between said arms and the separator element.

5. The check valve of claim 4, wherein the at least three arms of the retaining element are equilaterally spaced.

6. The check valve of claim 1, further comprising a reinforcing layer in the pliant sealing member.

7. The check valve of claim 6, wherein the reinforcing layer is one of a reinforcing fabric, nylon, polyester and Kevlar®.

8. The check valve of claim 1, further comprising:

a seal integrally formed with an inner surface of the pliant sealing member;

the seal configured to engage the separator element during reverse fluid flow; and the seal configured to provide a substantially fluid-tight seal between the pliant sealing member and the separator element.

9. The check valve of claim 8, wherein the seal is formed substantially around the perimeter of the inner surface of the pliant sealing member.

10. The check valve of claim 9, wherein the seal is an integrally formed pliant O-ring.

11. The check valve of claim 2, further comprising:

an inlet body flange;

an outlet body flange;

a seal adjacent each side of the separator element on a perimeter thereof, the separator element positioned between the inlet body flange and the outlet body flange; and the seal configured to provide a substantially fluid-tight seal between the inlet body flange, the outlet body flange and the separator element.

12. The check valve of claim 11, wherein the seal is received in a corresponding groove extending substantially around the perimeter of each side of the separator element.

13. The check valve of claim 11, wherein the seal is a pliant O-ring.

14. A check valve for placement in a fluid conduit, comprising:

an inlet conduit side through which fluid flows;

an outlet conduit side through which fluid flows;

a separator element positioned between the inlet conduit side and the outlet conduit side, the separator element having at least one opening to allow fluid flow through the separator element;

a pliant sealing member attached to the outlet conduit side of the separator element and configured to cover the at least one opening;

a pliant sealing member configured to deform during forward fluid flow, allowing fluid to pass around the pliant sealing member;

the pliant sealing member configured to flatten during reverse fluid flow, covering and preventing reverse fluid flow through the at least one opening; and a retaining element attaching the pliant sealing member to the separator element;

wherein the separator element has at least one solid, unopened area corresponding to the shape of the retaining element.

15. The check valve of claim 14, further comprising a reinforcing layer in the pliant sealing member.

16. A method of conveying fluid and preventing reverse fluid flow in a fluid conduit, comprising the steps of:

passing the fluid through at least one opening in a separator element;

conveying the fluid around a pliant sealing member attached to the separator element by a retaining element, the pliant sealing member positioned downstream of the separator element; and during reverse fluid flow, flattening the pliant sealing member over the separator element opening, preventing reverse fluid flow through the separator element opening; wherein the separator element has at least one solid, unopened area, said at least one unopened area corresponding to the shape of the retaining element.

\* \* \* \* \*